United States Patent [19]

Krüger et al.

[11] Patent Number: 5,224,117
[45] Date of Patent: Jun. 29, 1993

[54] GAS LASERS, IN PARTICULAR $CO_2$ LASERS

[75] Inventors: Wolfgang Krüger, Erlangen; Hubert Grosse-Wilde, Neunkirchen, both of Fed. Rep. of Germany

[73] Assignee: Siemens Aktiengesellschaft, Munich, Fed. Rep. of Germany

[21] Appl. No.: 768,697
[22] PCT Filed: Apr. 10, 1990
[86] PCT No.: PCT/EP90/00563
  § 371 Date: Oct. 17, 1991
  § 102(e) Date: Oct. 17, 1991
[87] PCT Pub. No.: WO90/13160
  PCT Pub. Date: Nov. 1, 1990

[30] Foreign Application Priority Data

Apr. 17, 1989 [DE] Fed. Rep. of Germany ....... 3912568

[51] Int. Cl.⁵ ............................................. H01S 3/097
[52] U.S. Cl. ........................................ 372/82; 372/66; 372/35; 372/37; 372/64; 372/59; 372/92; 372/55
[58] Field of Search ..................... 372/52, 59, 61, 64, 372/81–83, 92, 95, 35, 37, 70, 76

[56] References Cited

U.S. PATENT DOCUMENTS

| | | | |
|---|---|---|---|
| 4,646,313 | 2/1987 | Seeling | 372/64 |
| 4,719,639 | 1/1988 | Tulip | 372/82 |
| 4,890,294 | 12/1989 | Nishimae et al. | 372/82 |
| 4,987,577 | 1/1991 | Seunik et al. | 372/82 |

*Primary Examiner*—Leon Scott, Jr.
*Attorney, Agent, or Firm*—Kenyon & Kenyon

[57] ABSTRACT

A gas laser is designed with the following features: The laser is a slab laser, in which a plasma space (5) of a limited height is formed for the laser-active plasma between mutually opposing surfaces (11, 21) of two wall parts (10, 20); the wall parts (10, 20) are components of a coupling chamber with at least one coupling wall (30), which is connected to at least one distribution chamber (40,), whereby by injecting the high-frequency energy through the coupling wall (30), the gas plasma is activated in the desired manner over its entire length. The high-frequency energy for exciting the plasma lies in the gigahertz range, for which a magnetron is used, for example.

68 Claims, 3 Drawing Sheets

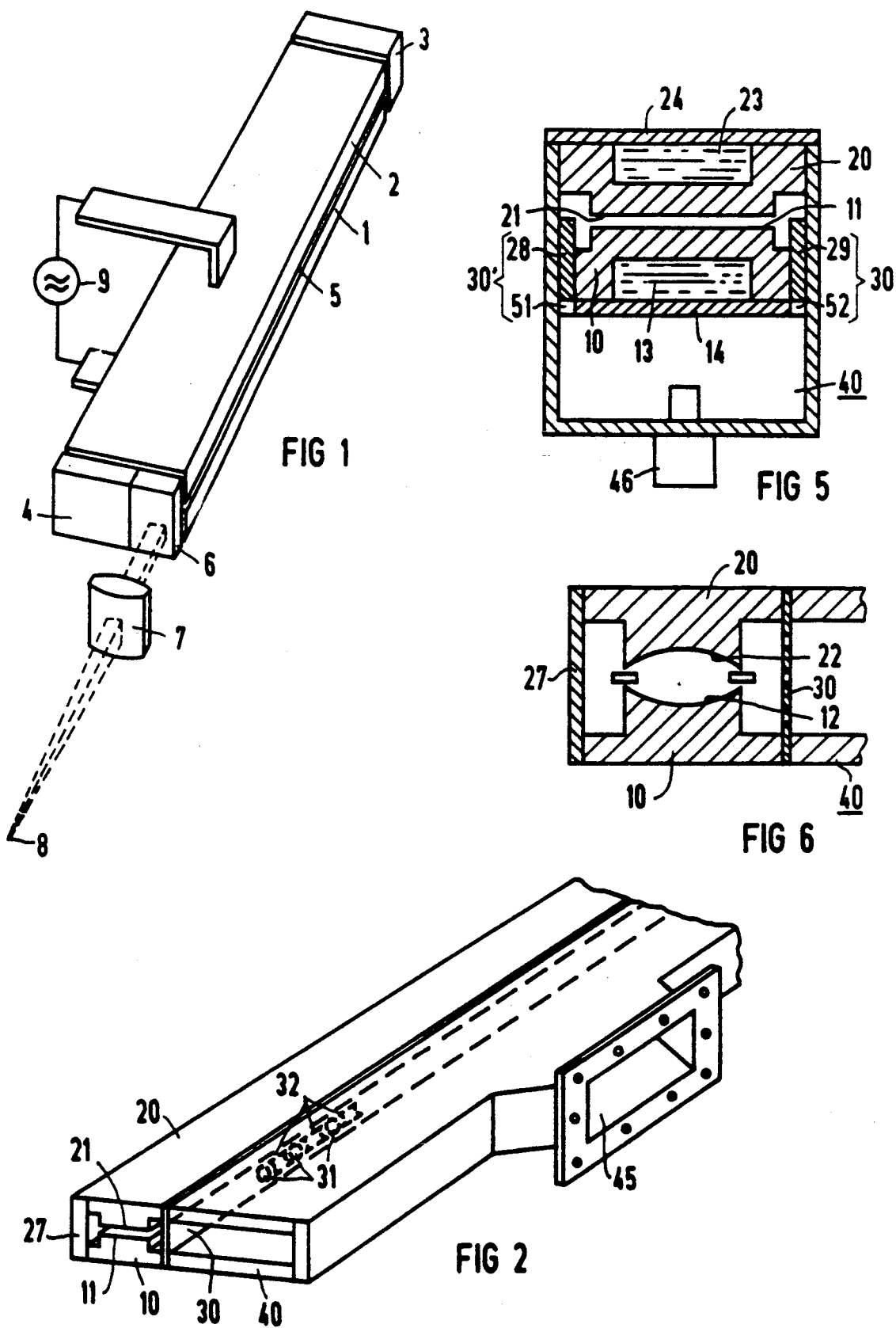

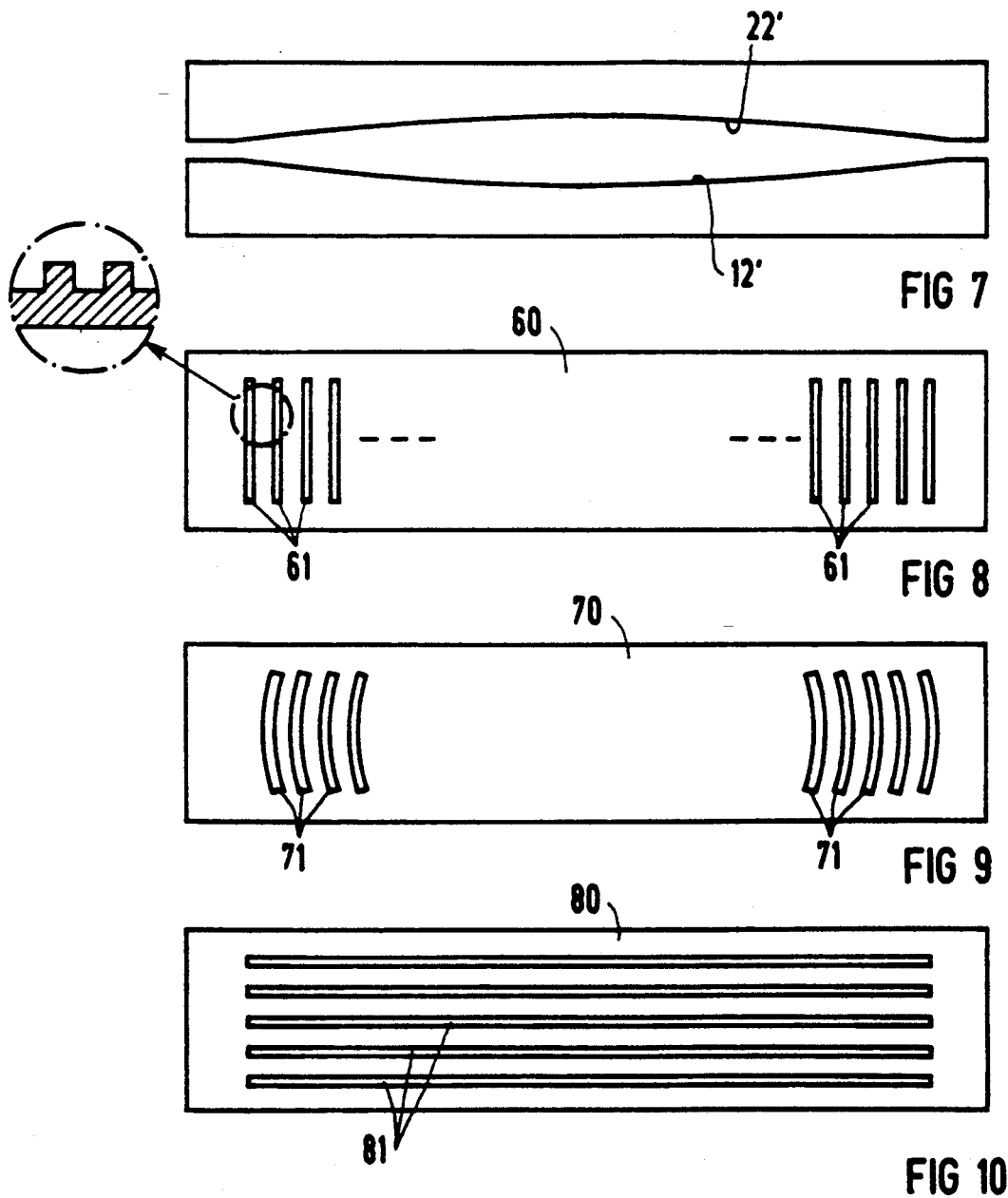

GAS LASERS, IN PARTICULAR CO$_2$ LASERS

FIELD OF THE INVENTION

The invention relates to a gas laser, in particular a CO$_2$ laser, in which the laser gas is excited by the supply of high-frequency energy. More particularly, the invention relates to the excitation of a slab laser by specifically coupling high-frequency energy.

BACKGROUND OF THE INVENTION

In gas lasers, the laser-active medium is a gas which is excited to a plasma. To maintain the plasma state, energy must be constantly supplied. This is usually done by applying an electric field, which is capable of accelerating the free electrons. In principle, the field can be a direct-current field or an alternating field, whereby an obvious solution is to inject high-frequency energy. The advantages of high-frequency excitation are that no losses occur at a series resistor and that there are no voltage drops across the cathodes region. The simple pulsing capability of the generators is advantageous for applications with gas lasers. However, so-called high-frequency boundary layers occur in the plasma which are laser-inactive. Moreover, a comparatively expensive generator is needed.

Theoretically, the frequency of the excitation energy can vary from the range of radio frequencies up to beyond the microwave range. However, at high frequencies, for example in the 2.45 GHz range usually used for microwave applications, it is difficult to inject the microwave energy uniformly and effectively in plasmas, whose expansion is great enough for a laser configuration.

The German Published Patent Application 37 43 358 discloses a so-called "fast-flow" laser, which is operated at a frequency of 2.45 GH$_z$. The gas that flows axially through the laser at a high speed is ignited with microwave energy even before it enters the laser. These types of lasers can produce a comparatively high power output in the kilowatt range; however, the laser gas must have a high flow-through speed in order to eliminate the dissipated heat of the plasma out of the laser-active volume.

From the technical literature (W. Ranz "Untersuchungen zur CO2-Laseranregung mit Mikrowellen-Gasentladungen in nichtresonanten Strukturen" [*Analyses of CO$_2$ Laser Excitation with Microwave Gas Discharges in Non-Resonant Structures*], Thesis (1988), FAU Erlangen-Burnberg), an excitation structure for a laser is known, in which a ceramic tube, which is situated inside a microwave guide and whose axis is aligned in the direction of propagation of the microwave energy, contains the laser-active gas. As a result of this design, the microwave power is attenuated by the plasma contained in the ceramic tube, so that the energy is injected into the plasma irregularly with respect to the longitudinal axis of the tube. Consequently, here as well, only so-called "running discharges" could be generated in a pulsed operation, so that at a time only a part of the gas is excited to the plasma state.

Furthermore, so-called slab lasers are known, in which the laser-active gas is situated between opposite surfaces of two wall parts, which are equally designed as electrodes for injecting the energy. In the case of the German Published Patent Application 37 29 053, a high-frequency electric alternating field is injected into such a gas slab laser. It advantageously foresees injecting the high-frequency energy at several locations to provide for uniform activation over the entire length.

Finally, the EP-A-O 275 023 discloses a type of gas slab laser, in which the excitation is supposed to take place with high-frequency energy in the radio-frequency range, whereby the energy is supplied via lines to the upper wall part of the laser configured in a receptacle. In this case, the frequency has an upward limitation, since otherwise standing waves would form and lead to corresponding irregularities of the plasma.

Given a discharge volume of a slab laser, it is desirable to increase the laser's power output by increasing the injected electric power accordingly. This is possible then at a constant plasma gas temperature, when the clearance between the plasma-limiting surfaces of the slab laser is reduced, since the diffusion cooling is improved by this means.

In previously known slab lasers, however, restrictions have been placed on reducing the electrode spacing because the laser-inactive boundary layers existing along the two surfaces of the slab electrodes restrict the thickness of the active plasma layer. A way out would be to increase the system frequency, for example up into the microwave range, since the thickness of the boundary layers decreases with increasing frequency.

EP-A-O 280 044 discloses a plasma apparatus, by which the microwave energy can be injected into a band-shaped plasma space. The microwave energy is thereby supplied laterally via a horn-type waveguide or a ridged waveguide to the plasma space. With this construction, one must accept that a standing wave with wave nodes forms in the plasma space with the result that no laser excitation takes place in the area of the nodes. Therefore, the volume of the plasma space is only partially used. This undesirable effect becomes particularly evident in the case of non-pulsed microwave excitation. None of the means described in the EP-A-O 280 044 is suited for stopping the occurrence of standing waves with irregular excitation of the laser gas. Even in the case of pulsed microwave excitation, considerable irregularities can occur, as well as the tendency to form filaments or arcs. The latter are undesirable, since as is generally known, in the case of the laser, they lead to a reduction in the radiant power due to time-related beam fluctuations and to an acceleration of the gas decomposition.

An arrangement is known from U.S. Pat. No. 4,513,424 in which microwave energy is injected parallel to a microwave guide through a coupling wall into a tube containing laser gas. Here, to be sure, no nodes develop over the length of the tube containing the laser gas, and theoretically a uniform plasma excitation can take place over the length of the tube; however, only a fraction of the microwave energy is coupled out of the hollow conductor into the plasma tube. In this arrangement, the major portion of the microwave energy is lost as the result of heat conversion.

Therefore, the object of the invention is to improve the energy injection into the laser gas in the case of a gas laser, so that by means of microwave energy, a uniformly excited plasma is produced in a flat, elongated volume. In particular, no wave nodes or antinodes should develop thereby in the plasma volume, and the microwave energy should be injected nearly completely into the plasma volume. In particular, it is the object of the invention to create such an arrangement, in which the clearance between the walls of the plasma space can be reduced to the extent that a slab clearance of about 1/10 mm or less results. In this manner, it should also be possible to use optical resonator configurations for gas lasers in the near infrared range according to the slab laser concept. It is known to use such configurations for gas lasers in the far infrared range and for semiconductor lasers.

The objective is solved according to the invention by the characteristics of patent claim 1 or patent claim 2 in their entirety. Further developments follow from the individual dependent claims, whereby these claims also indicate in particular the operating method of a laser designed according to the invention.

SUMMARY OF THE INVENTION

According to the present invention, arrangements are produced which makes it possible to excite a gas laser according to the slab laser concept using microwaves. For the first time, a flat plasma layer is generated as the result of the uniform excitation by microwaves, whereby at least one linear dimension of the excited plasma layer can amount to a multiple of the free-space wavelength of the exciting high-frequency or microwave generator.

Further, according to the present invention, the clearance between the wall parts and the opposite surfaces can be varied as desired. Clearances of less than 30 μm up to over 5 mm are possible. The gas pressure can lie between 10 mbar and a few bar.

In the case of the present invention, it is particularly advantageous that by reducing the boundary surfaces at the electrode surfaces, the spacing of the electrodes, which act at the same time as a waveguide for the laser radiation, can be kept so small, that for example, regular, periodic increases and/or deepening of, for example, ¼ of the wavelength of the laser radiation can be effective for the formation of a laser resonator. In place of this periodic geometric structure, it is also possible to utilize structures which represent a periodic change in the refractive index for the wavelength of the concerned laser. The periodic structure brings about a reflection of the laser radiation. In other realizations such lasers are known as "distributed feedback lasers" (DFB lasers). In these types of lasers, one can dispense with the application of mirrors. This is explained in detail in the technical literature (D. Marcuse, *Hollow Dielectric Waveguide for Distributed Feedback Lasers*, IEEE Journal of Quantum Electronics, Vol. QE-8, no. 7, July 1972, pp 661 through 669).

The material of the wall surfaces, which make up the waveguide, advantageously features minimal losses by reflection for the radiation of the laser, so that the attenuation damping action is negligible. Both metallic surfaces as well as surfaces of semiconductive materials, such as doped silicon or germanium oxide, are suited, just as are non-conductive materials such as aluminum oxide or beryllium oxide, however.

The plasma space is a component part of a microwave waveguide structure—in the following, also called coupling chamber or coupling waveguide—, whose phase wavelength at the operating frequency $f_o$ of the generator in the longitudinal direction corresponds more or less to the length of the plasma space or exceeds this dimension. The phase wavelength is established thereby for the selected system frequency through the cross-sectional geometry of the coupling chamber according to the design rules that apply to waveguide elements. As an alternative, it is also possible to dimension the cross-section of the coupling chamber so that the phase wavelength becomes imaginary, thus an aperiodically attenuated wave exists in the waveguide. At this point, the energy is no longer supplied to this coupling chamber, as it is according to the new prior art, from the ends of the laser or at a few points in-between, but rather essentially from at least one side and in fact through a multitude of coupling ports distributed along the longitudinal axis. The coupling ports establish the connection to a second waveguide element, the distribution waveguide, which has the same longitudinal dimension as the coupling waveguide. The distribution waveguide is designed in the same way as the coupling waveguide, so that its phase wavelength more or less reaches or exceeds the longitudinal dimension of the laser. The microwave energy is injected into the distribution waveguide using known methods, for example from a magnetron by way of a horn.

BRIEF DESCRIPTION OF THE DRAWINGS

FIG. 1 shows the principle of a slab laser.

FIGS. 2 through 4 show embodiments of slab lasers according to the present invention in a perspective representation.

FIG. 5 shows another embodiment of a slab laser according to the present invention in section.

FIG. 6 shows a embodiment of a transverse contour of the opposite surfaces of the wall parts of the plasma space;

FIG. 7 shows a corresponding longitudinal contour.

FIGS. 8 through 10 shows specific structures on one or both of the opposite surfaces of the wall parts.

BEST MODE FOR CARRYING OUT THE INVENTION

Figure 3:
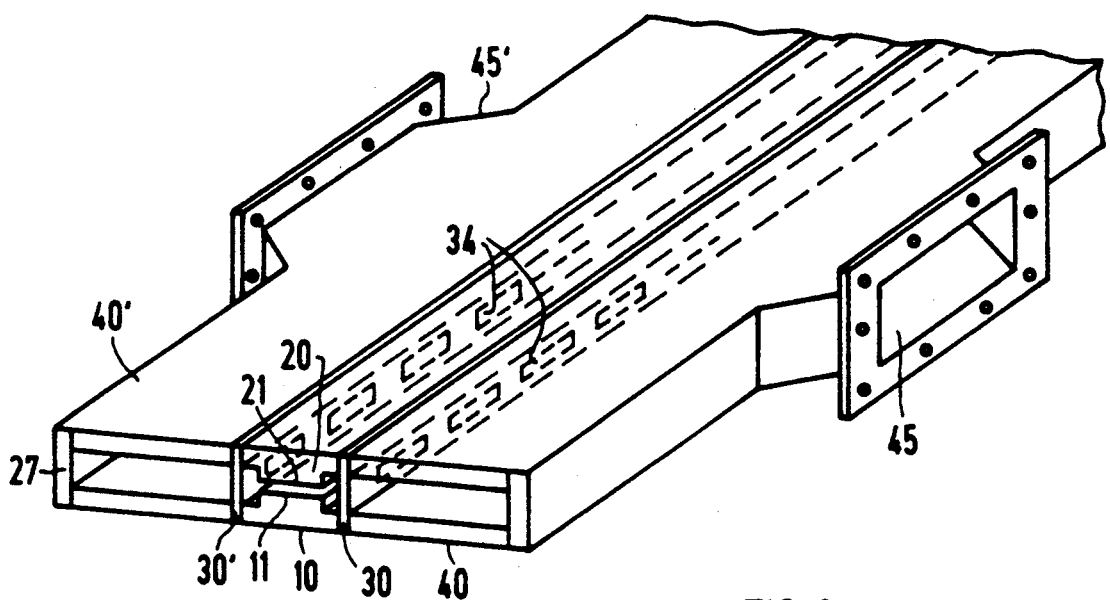

In FIG. 1, two plate-like wall parts 1 and 2 with corresponding end parts 3, 4 and 6 enclose a plasma space 5, which characterizes the principle of the gas slab laser. The wall parts 1 and 2 form electrodes for supplying the high-frequency energy of a generator 9.

Slab gas lasers are described as those laser configurations, in which the laser-active plasma is excited between two wall surfaces, which stand opposite each other as flat surfaces with a narrow clearance and which demonstrate such good reflection properties for the laser radiation generated in the plasma, that they determine the beam guidance. Mirrors can be arranged in each of the end parts 3 and 4, whereby optical means 6 and 7 for coupling out and focussing the laser radiation are also provided.

The plasma is usually excited with the help of an electric high-frequency field, whose field strength is mostly aligned perpendicularly to these surfaces. To draw off the thermal power loss, the plates are kept at a constant temperature by means of an adequately dimensioned water or air cooling. The maximum temperature difference that occurs between the hottest spot in the plasma, for example the median plane, and the wall is largely determined by the lower loss in the plasma and by the plate clearance. If the maximum allowable gas temperature is established by the laser process in the excitation plasma, such as in the case of the $CO_2$ and CO laser, then the excitation energy and, accordingly, the laser power output can be made all the greater, the smaller the clearance of the surfaces confining the slab is.

The highest permissible temperature difference between the hottest spot in the plasma and the wall surfaces follows from the fact that at the spots where a specific limiting temperature is exceeded in the plasma, the generation of laser photons quickly declines, and that the temperature of the wall surfaces is specified by the arrangement of the cooling device and the thermal energy to be drawn off.

In the prior art, the limit for reducing the plate clearance and thus also for increasing the laser's power output is determined by the fact that a boundary layer always forms along the surfaces that contributes only little or nothing to the generation of the laser radiation. Thus, for example, at an excitation frequency of 100 MHz and a plate clearance of 1.5 mm, about a third of the plasma volume is lost for the laser excitation as a result of the two boundary layers at the electrodes. It is known, however, that the thickness of the boundary layer decreases more or less proportionally to the frequency of the excitation energy. The relative portion of the usable plasma volume rises, therefore, at higher excitation frequencies, and furthermore the plate clearance can also be reduced then to improve the cooling. The laser's power output can therefore be increased, when higher generator frequencies are chosen. Up until now, however, one could not make use of this general realization, because in the known devices, a field and energy distribution results over the surfaces, which is all the more irregular, the smaller the wavelength of the excitation energy is, compared, for instance, to 10-times the largest linear dimension.

Two wall parts 10 and 20 are developed in such a way in FIG. 2, so that together in cross-section, they are similar to a rectangular or ridged waveguide. The inner wall surfaces 11 and 21 face opposite each other and enclose a plasma space. On the one side, this structure is closed off by a crosspiece 27; on the other side, there is a so-called coupling wall 30. The wall parts 10 and 20 are connected by way of the coupling wall 30 to a waveguide-type structure 40, into which, for its part, high-frequency energy in the microwave range can be injected via a coaxial connection or, in particular, via a horn 45.

The structure 40 runs over the entire length of the plates 10 and 20, while the injecting point 45 is situated in the middle (sectional plane). Thus, a distribution chamber 40 is created for microwaves, which are injected out of the wall parts 10 and 20 via the coupling wall 30 into the structure. Consequently, this structure forms a coupling chamber for the microwaves, through which the high-frequency energy is transmitted into the plasma situated between the surfaces 11 and 21.

The coupling wall 30 features coupling ports 31 and 32, which are distributed over the entire longitudinal direction. Slits, round or rectangular holes, or also combinations thereof are suited as coupling ports. For example, two rows of slits 31 and 32 can be formed, which are each situated lengthwise over gaps. Alternatively, the slits can also have a zigzag design or, in combination with round holes, form dumb-bell-shaped structures. Instead of the coupling ports, coupling crosspieces or coupling loops in the coupling wall are likewise possible.

Therefore, in the specific embodiment according to FIG. 2, the high-frequency energy is injected uniformly over the entire length of the strip conductor laser from one of the two sides. The crosspiece 27 forms a reflection wall. Altogether therefore, over the cross-section of the waveguide-type structure, a field-strength distribution is able to be attained, which in the area of the plasma space is similar to a sine shape and which drops off on one side.

In FIG. 3, the high-frequency energy is supplied simultaneously from two opposite sides to a strip conductor laser with the wall parts 10 and 20 and with the laser volume enclosed by the surfaces 11 and 21. For this, two distribution chambers 40 or 40', each with one horn 45 or 45', are disposed in a mirror-inverted arrangement. They inject the high-frequency energy via one coupling wall each 30 or 30' into the coupling chamber designed in accordance with FIG. 2.

Figure 4:
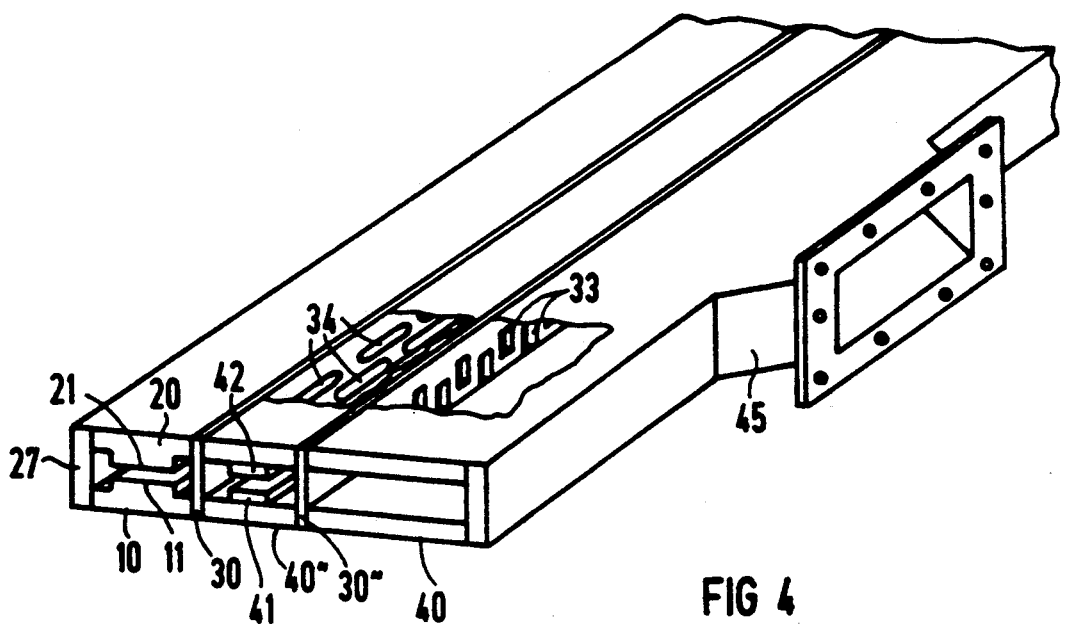

It is also possible according to FIG. 4 to arrange two distribution chambers 40 and 40" side-by-side on one side of the coupling chamber 10, 20. In a generally known way, the first distribution chamber 40 has a horn 45 for connecting the high-frequency generator and a coupling wall 30" with staggered coupling ports 33. The high-frequency energy is transmitted through these coupling ports 33, which can also have a structure as in FIG. 2, into the second distribution chamber 40". In quite the same way, the high-frequency energy is injected from there into the actual slab laser via a second coupling wall 30 provided with coupling ports 34.

A further evening-out of the energy over the longitudinal extent of the laser can be achieved as a result of the two side-by-side distribution chambers 40 or 40". The differently designed coupling ports 33 and 34 contribute to this in particular. To realize additional variations, it is also possible to influence the waveguide structures by means of optionally movable ridges 41 or 42.

In FIG. 5, 10 and 20 denote the wall parts with their opposing surfaces 11 and 21 in accordance with FIG. 2. Slots 13 and 23 are provided in each of the wall parts 10 and 20 for a water cooling. They are closed off to the rear by terminating walls 14 and 24. A distribution chamber 40 is allocated in turn to the thus-formed coupling chamber. In this specific embodiment, however, the distribution chamber 40 is situated below the coupling chamber formed by the wall parts 10 and 20 and joins-up with it in the form of a rectangular hollow conductor 40. A magnetron 46 is configured directly next to the base of the hollow conductor 40. In this case, the high-frequency energy is transmitted through cut-outs 51 and 52 at the end areas of the terminating wall 14. Joining up with these cut-outs on both sides are dielectrically effective parts 28 and 29. Thus, in connection with the cut-outs 51 or 52, the parts 28 or 29 have the effectiveness of the coupling walls 30 or 30' of FIG. 3. Consequently, it is possible to have a two-sided injection of a magnetic field from the single distribution chamber 40 into the coupling chamber, whereby a substantially constant field strength without any drop results in the area of the slab due to the superimposition of two half-waves.

As a result of the specified field strength distribution over the cross-section of the coupling chamber according to one of the FIGS. 2 through 5, the laser-active gas plasma is able to be uniformly maintained between the surfaces 11 and 21. The plate clearance can be reduced to 30 um, for example, without the boundary layers having a disturbing effect. The gas pressure can lie between 10 mbar and a few bar, in accordance with the prevailing requirements. A gas mixture of $CO_2:N_2:He$ in proportions of 20:20:60 is provided, for example, as the laser gas.

In the case of a concrete realization of the ridged waveguide, the wall parts 10 and 20 consist of a metallic conductive material. In some case, the material of components of the wall parts may be dielectrically effective, whereby to guarantee the infrared-optical quality, the wall surfaces 11 and 21 can be metallic or coated with a suited material, for example with doped silicon or germanium oxide. It is advantageous to have regular, periodic Bragg structures on the surfaces 11 and 21 of the wall parts 10 and 20. Thus, in the case of the realized slab laser, a high frequency selection is able to be realized, whereby one can dispense with reflectors.

FIG. 6 depicts a configuration of the coupling chamber according to FIG. 2, in which the two wall parts 10 and 20 with their opposite surfaces have a contour 12 and 22, respectively, in the transverse direction. In each case, this contour can form a circular cut-out, for example. In quite the same way, FIG. 7 depicts a section which is perpendicular to FIG. 6, in which the wall parts 10 and 20 form with their opposing surfaces a lengthwise contour 12' or 22', which can likewise have a predetermined function.

In FIG. 8, periodic structures 61 are applied to the surfaces 11 or 21 of the wall parts 10 or 20 perpendicularly to the longitudinal direction of the wall parts. These structures form projections or depressions and influence the laser light. In particular according to FIG. 9, the structures 61 can be circular segments 71 or have other predetermined forms. However, longitudinal structures 81 according to FIG. 10, which run in the axial direction of the wall parts 10 or 20, can also be provided.

The type and geometry of the structures are able to be derived from Bragg's equations and determined for the specific laser wavelengths. Consequently, reflections or suited beam guidance can be achieved. In particular, the structures according to FIGS. 8 or 9 can be combined with the structure according to FIG. 10 in such a way that longitudinal structures are provided in the middle area of the wall parts 10 and 20, and transverse structures are provided in each case in the outer area, at least on one of the surfaces. At the same time, these structures can also be combined in accordance with the transverse or longitudinal contours, developed according to FIGS. 6 and 7, of the mutually opposing surfaces 11 and 21 of the wall parts 10 and 20.

High-frequency energy in the gigahertz range can be injected into the laser configurations according to FIGS. 2 through 5, modified possibly according to FIGS. 6 through 10, since waveguide-type structures for microwaves are formed. The high-frequency energy is injected, for example by means of a coupling pin or a coupling loop of a known coaxial line junction, or directly with a coupling pin of a magnetron, for example for 2.45 GHz, which is connected more or less in the middle of the longitudinal extent of the distribution chamber connected to the coupling chamber. Thus, a substantially constant field distribution results along the plasma space.

Laser configurations, in which new gas is not continuously conducted into the plasma, are usually provided with a gas supply, whose volume amounts, for example, to 100 times the gas volume excited to the plasma state.

In this case, one can advantageously use the coupling chamber outside of the mutually opposing surfaces 11 and 21, and the distribution chamber 40 as a supply chamber. They must be hermetically sealed. Additional receptacles are then not necessary. At the coupling walls 30 or 30', or 30'', which are situated in the laser gas, the occurring electric field strength must lie far enough below the ignition field strength of the laser gas. This can always be effected. Coupling means which protrude out of the coupling wall, for example crosspieces and/or loops, can be applied very advantageously here.

In the case of molecular gas lasers, one has to expect that a portion of the gas will decompose in the plasma and enter into other compositions. For the regeneration, devices are known, such as catalysts of various types and composition, for which sufficient space is provided in the coupling chamber itself or in the distribution chamber.

To the extent that these devices require a certain temperature to fulfill their function, they can be heated in the arrangement by a small share of the high-frequency energy or they can be heated by the natural convection of the rising gas heated in the plasma. For this purpose, it is advantageous to position the surfaces 11 and 21 of the wall parts 10 and 20 as perpendicular as possible and to arrange the device above them in the convection current.

A certain difficulty, which relates to many surface discharge paths with a small electrode clearance, has to do with the fact that the ignition field strength is considerably higher than the burning field strength. Therefore, it can also be necessary in this case to provide auxiliary devices to ignite the laser plasma. Such an auxiliary device can be a spark gap, for example, which is arranged in the vicinity of the two opposing surfaces 11 and 21 and can be ignited from the outside space via a hermetically sealed, insulated electric connection.

As an alternative, the ultraviolet radiation of a gas excited to a plasma, for example, can also be used advantageously for the same purpose. On the basis of its pressure and its composition, it ignites with a low electric field strength. It is situated in a hermetically sealed tube made of quartz glass, for example. On the basis of this arrangement, it can radiate into the space between the two opposing surfaces 11 and 21 of the wall parts 10 and 20, when it is excited by high-frequency energy, in particular microwave energy. The power required for this ultraviolet source can thereby be kept low, particularly when the electric field strength in this tube sinks below the burning field strength after the laser plasma is ignited.

Another possibility for improving the ignition resides in supplying the microwave energy in the form of microwave pulses to the plasma chamber in such a way that the field strength at the beginning of each pulse is so high that the plasma ignition follows reliably and, for the remaining course of the pulse, is just enough to allow the plasma to burn stably.

Overall, therefore, a slab laser with increased energy yield results, whose excitation energy can be generated and supplied comparatively easily and inexpensively, and which is nevertheless designed to be so compact, that it can be manipulated by a robot or other devices in automated manufacturing.

What is claimed is:

1. A slab gas laser, in particular a $CO_2$ slab laser, in which laser gas is excited by a high-frequency energy, comprising:

at least one distribution chamber;

a coupling chamber including at least two wall parts having mutually opposing surfaces, between which a plasma space having a length and a limited height is formed for laser-active plasma and plasma excitation takes place, the coupling chamber further including at least one coupling wall having a plurality of coupling ports through which the coupling chamber is coupled to the distribution chamber;

the distribution chamber and the coupling chamber being waveguides having dimensions for supporting a longitudinally propagating wave of a fundamental mode such that over a predetermined range of frequencies, a phase wavelength either comes close to the length of the plasma space, exceeds the length of the plasma space, or becomes mathematically imaginary so that at least one of the distribution chamber and the coupling chamber acts as a waveguide with aperiodic attenuation; and a substantially in-phase injection of the high-frequency energy from the distribution chamber takes place through the plurality of coupling ports in the coupling wall, whereby the plasma is uniformly excited over the entire length of the plasma space.

2. The gas laser according to claim 1 wherein the coupling chamber comprises a rectangular cross-section.

3. The gas laser according to claim 1, wherein the opposite surfaces of the wall parts have a specified contour and structure.

4. The gas laser according to claim 1, wherein the distribution chamber has the form of a hollow conductor.

5. The gas laser according to claim 4, further comprising a high-frequency generator coupled to the distribution chamber.

6. The gas laser according to claim 1, wherein the distribution chamber is disposed laterally next to the coupling chamber.

7. The gas laser according to claim 1, further comprising a plurality of longitudinal crosspieces provided inside the distribution chamber for forcing suitable phase wavelengths.

8. The gas laser according to claim 1, wherein the coupling ports comprise openings adapted for microwaves.

9. The gas laser according to claim 8, further comprising two or more rows of parallel slits.

10. The gas laser according to claim 8, wherein the openings are disposed over the entire length of the coupling wall in a preselected shape.

11. The gas laser according to claim 1, wherein the coupling wall includes coupling crosspieces along its longitudinal axis.

12. The gas laser according to claim 1, wherein the coupling chamber includes at least two coupling walls.

13. The gas laser according to claim 12, wherein the high-frequency energy is injected out of the distribution chamber in phase and from opposite sides through the two coupling walls into the coupling chamber.

14. The gas laser according to claim 12, wherein the laser comprises at least two distribution chambers, wherein the coupling chamber includes at least two coupling walls, and wherein the high-frequency energy is injected out of the two distribution chambers through the two coupling walls into the coupling chamber.

15. The gas laser according to claim 1, wherein the distance between the opposite surfaces of the wall parts is at least 20 $\mu$m and at most 5 mm.

16. The gas laser according to claim 1, wherein the two wall parts are cooled by a fluid.

17. The gas laser according to claim 1, wherein the two surfaces of the wall parts enclosing the plasma are laterally sealed, at least partially, by perpendicular crosspieces made of insulating material.

18. The gas laser according to claim 1, wherein at least parts of the coupling chamber and distribution chamber are hermetically sealed by non-conducting elements, creating a supply chamber for the laser gas.

19. The gas laser according to claim 1, wherein the wall parts include a dielectrically effective material and at least their opposing surfaces exhibit a high optical quality.

20. The gas laser according to claim 19, wherein the opposing surfaces of the wall parts include optically effective structures which guide a beam and which can affect utilization of the laser-active plasma, the beam quality and selection of the optical mode as a result of a distributed reflection, diffraction and refraction of the beam guidance.

21. The gas laser according to claim 1, wherein the opposing surfaces of the wall parts are coated with a semiconductive material.

22. The gas laser according to claim 1, wherein the laser gas is a mixture of $CO_2:N_2:He$ approximately in proportions of 10:20:60.

23. The gas laser according to claim 1, wherein a pressure of the laser gas is between 10 mbar and 5 bar.

24. The gas laser according to claim 1, wherein the high-frequency energy for exciting the laser gas has a frequency of approximately 2.45 GHz.

25. The gas laser according to claim 24, further comprising a magnetron coupled to the coupling chamber for generating the high-frequency energy.

26. The gas laser according to claim 24, wherein the injection of the high-frequency energy takes place through a vacuum-tight window.

27. The gas laser according to claim 1, wherein, an electric field strength in a space occupied by the laser gas outside of the plasma space and outside of an area of any devices provided for igniting the plasma, is less than an electric field strength in the plasma space.

28. The gas laser according to claim 1, wherein a magnetic field strength is sufficiently high and an electric field strength is sufficiently low such that the electric field strength does not cause the plasma to ignite.

29. The gas laser according to claim 1, further comprising a plurality of devices, which at least partially bring about a regeneration of the laser gas, disposed in the volume taken by the laser gas.

30. The gas laser according to claim 29, wherein the regeneration comes about as a result of absorption of high-frequency energy.

31. The gas laser according to claim 1, wherein, during laser operation, the mutually opposing surfaces of the wall parts are positioned horizontally.

32. The gas laser according to claim 1, wherein, during laser operation, the mutually opposing surfaces of the wall parts are positioned perpendicularly to promote a convective exchange of gas out of the plasma with remaining laser gas, and a pouring-out of an existing catalyst.

33. The gas laser according to claim 1, further comprising, in the vicinity of the opposing surfaces of the wall parts, a device for reducing an ignition field strength required for the laser gas situated between the surfaces.

34. The gas laser according to claim 33, wherein the device for reducing the ignition strength includes a receptacle, which is transparent in an ultraviolet spectral region and which has a hermetically sealed gas volume, the gas volume being excited by a portion of the injected high-frequency energy for emitting ultraviolet radiation.

35. The gas laser according to claim 1, wherein the high-frequency energy is supplied in pulses.

36. The gas laser according to claim 35, wherein a field strength is higher at the beginning of each pulse than at the remainder of each pulse.

37. The gas laser according to claim 1, wherein the coupling chamber comprises a ridged cross-section.

38. The gas laser according to claim 1, wherein the coupling wall includes coupling loops along its longitudinal axis.

39. A slab gas laser, in particular a slab $CO_2$ laser, in which laser gas is excited by high-frequency energy, comprising:
at least one distribution chamber;
a coupling chamber including at least two wall parts having mutually opposing surfaces, between which a plasma space having a length and a limited height is formed for laser-active plasma and plasma excitation takes place, the coupling chamber further including at least two lateral, dielectrically effective crosspieces disposed outside of the plasma space and through which the coupling chamber is coupled to the distribution chamber;
the distribution chamber and the coupling chamber being waveguides having dimensions for supporting a longitudinally propagating wave of a fundamental mode such that over a predetermined range of frequencies, a phase wavelength either comes close to the length of the plasma space, exceeds the length of the plasma space, or becomes mathematically imaginary so that at least one of the distribution chamber and the coupling chamber acts as a waveguide with aperiodic attenuation; and
a substantially in-phase injection of the high-frequency energy from the distribution chamber taking place through the dielectric crosspieces,
whereby the plasma is uniformly excited over its entire length.

40. The gas laser according to claim 39, wherein the distribution chamber is disposed below the coupling chamber.

41. The gas laser according to claim 39 wherein the coupling chamber comprises a rectangular cross-section.

42. The gas laser according to claim 39, wherein the opposite surfaces of the wall parts have a specified contour and structure.

43. The gas laser according to claim 39, wherein the distribution chamber has the form of a hollow conductor.

44. The gas laser according to claim 42, further comprising a high-frequency generator coupled to the distribution chamber.

45. The gas laser according to claim 39, further comprising a plurality of longitudinal ridges provided inside the distribution chamber for forcing suitable phase wavelengths.

46. The gas laser according to claim 39, wherein the distance between the opposite surfaces of the wall parts is at least 20 $\mu$m and at most 5 mm.

47. The gas laser according to claim 39, wherein the two wall parts are cooled by a fluid.

48. The gas laser according to claim 39, wherein the two surfaces of the wall parts enclosing the plasma are laterally sealed, at least partially, by perpendicular crosspieces made of insulating material.

49. The gas laser according to claim 39, wherein at least the coupling chamber and distribution chamber are hermetically sealed by non-conducting elements, creating a supply chamber for the laser gas.

50. The gas laser according to claim 39, wherein the wall parts include a dielectrically effective material and at least their opposing surfaces exhibit a high optical quality.

51. The gas laser according to claim 50, wherein the opposing surfaces of the wall parts include optically effective structures, which guide a beam and which can affect utilization of the laser-active plasma, the beam quality and selection of the optical mode as a result of a distributed reflection, diffraction and refraction of the beam guidance.

52. The gas laser according to claim 39, wherein the opposing surfaces of the wall parts are coated with a semiconductive material.

53. The gas laser according to claim 39, wherein the laser gas is mixture of $CO_2:N_2:He$ approximately in proportions of 10:20:60.

54. The gas laser according to claim 39, wherein a pressure of the laser gas is between 10 mbar and 5 bar.

55. The gas laser according to claim 39, wherein the high-frequency energy for exciting the laser gas has a frequency of approximately 2.45 GHz.

56. The gas laser according to claim 55, further comprising a magnetron coupled to the coupling chamber for generating the high-frequency energy.

57. The gas laser according to claim 55, wherein the injection of the high-frequency energy takes place through a vacuum-tight window.

58. The gas laser according to claim 39, wherein, an electric field strength in a space occupied by the laser gas outside of the plasma space and outside of an area of any devices provided for igniting the plasma, is less than an electric field strength in the plasma space.

59. The gas laser according to claim 39, wherein a magnetic field strength is sufficiently high and an electric field strength is sufficiently low such that the electric field strength does not cause the plasma to ignite.

60. The gas laser according to claim 39, further comprising a plurality of devices, which at least partially bring about a regeneration of the laser gas, disposed in the volume taken by the laser gas.

61. The gas laser according to claim 60, wherein the regeneration comes about as a result of an absorption of high-frequency energy.

62. The gas laser according to claim 39, wherein during laser operation, the mutually opposing surfaces of the wall parts are positioned horizontally.

63. The gas laser according to claim 39, wherein during laser operation, the mutually opposing surfaces of the wall parts are positions perpendicularly to promote a convective exchange of gas out of the plasma with remaining laser gas, and a pouring-out of an existing catalyst.

64. The gas laser according to claim 39, further comprising, in the vicinity of the opposing surfaces of the wall parts, a device for reducing an ignition field strength required for the laser gas situated between the surfaces.

65. The gas laser according to claim 64, wherein the device for reducing the ignition field strength includes a receptacle, which is transparent in an ultraviolet spectral region and which has a hermetically sealed gas volume, the gas volume being excited by a portion of the injected high-frequency energy for emitting ultraviolet radiation.

66. The gas laser according to claim 39, wherein the high-frequency energy is supplied in pulses.

67. The gas laser according to claim 66, wherein a field strength is higher at the beginning of each pulse than at the remainder of each pulse.

68. The gas laser according to claim 39, wherein the coupling chamber comprises a ridged cross-section.

* * * * *